United States Patent [19]

Suzuki

[11] 4,075,908
[45] Feb. 28, 1978

[54] CONTROL LEVER LOCKING MECHANISM
[75] Inventor: Shoji Suzuki, Iwaki, Japan
[73] Assignee: ALPS, Motorola, Inc., Japan
[21] Appl. No.: 538,095
[22] Filed: Jan. 2, 1975
[30] Foreign Application Priority Data
  Feb. 16, 1974 Japan .................................. 49-18949
[51] Int. Cl.$^2$ .............................................. G05G 5/06
[52] U.S. Cl. ........................................ 74/527; 360/60
[58] Field of Search ............... 360/60, 61, 137; 70/57, 70/144, 201; 74/503, 527, 537, 538

[56] References Cited
U.S. PATENT DOCUMENTS
3,454,731  7/1969  Hori et al. ............................... 360/61

Primary Examiner—James W. Moffitt
Attorney, Agent, or Firm—James W. Gillman; Donald J. Lisa; Phillip H. Melamed

[57] ABSTRACT

A tape recorder/player includes several slideable mode selector control levers for selecting the reproducing, recording, stop and other modes of operation of the player. To prevent operation of these levers when the cassette or tape is not in the player, a slideable cam plate is provided, which in a first position engages projections on the levers to prevent them from being moved into their operative positions. In a second position, a number of slots in the cam plate are aligned with the projections on the control levers to permit their movement to select the desired function. A solenoid is energized whenever a cassette or tape is inserted into the recorder/player and controls movement of the cam plate to its second position to align the aperatures with the projections of the levers to permit their operation. When the cassette or tape is removed from the player, the solenoid is de-energized returning the cam plate to the first position where it prevents operation of the control levers.

2 Claims, 5 Drawing Figures

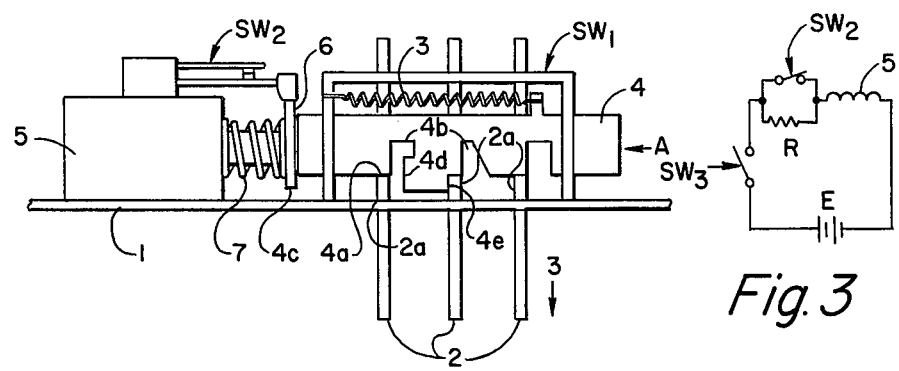
Fig. 1
Fig. 3
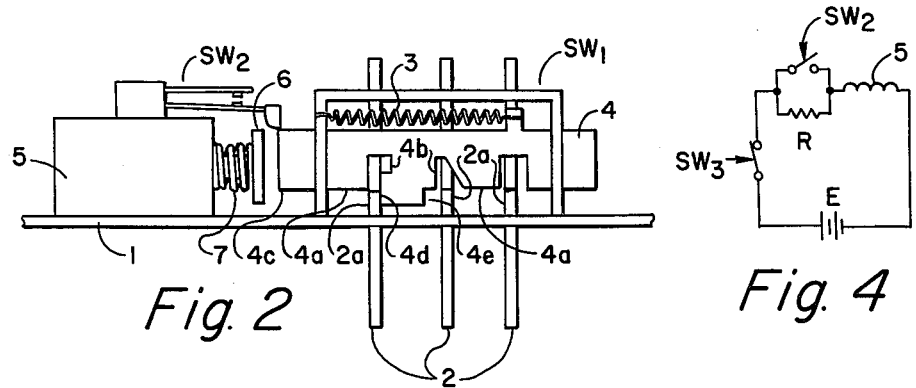
Fig. 2
Fig. 4
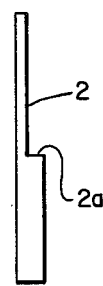
Fig. 5

CONTROL LEVER LOCKING MECHANISM

BACKGROUND OF THE INVENTION

In conventional magnetic tape recorder/players of, for instance, the cassette type, the magnetic head is interconnected with the function control levers; so that when either one of the control levers for operating the tape recorder in the recording or reproducing modes is depressed, the magnetic head is introduced into the space in which a cassette has been inserted and is brought into contact with the magnetic tape in the cassette.

However, if either of the above-mentioned function control levers is depressed before the insertion of a cassette, the magnetic head will be introduced into the space in which the cassette has not yet been inserted. This not only hampers the subsequent insertion of a cassette, but also may result in damage to either the magnetic head or the magnetic tape or both. As a consequence, it is desirable to provide a simple and effective means to prevent operation of the function control levers when no cassette is inserted into the recorder/player.

SUMMARY OF THE INVENTION

Accordingly, it is an object of this invention to provide an improved function lever control mechanism.

It is another object of this invention to provide a tape recorder/player in which the control levers are prevented from being depressed when no tape cassette or the like is in the tape recorder/player.

An additional object of the invention is to provide a tape recorder/player function lever locking mechanism of simple construction and positive operation.

Still another object of the invention is to provide a tape recorder/player having a provision for preventing the depression of the control levers using an electrically operable mechanism of a low power consumption and of small size.

In accordance with a preferred embodiment of this invention, a switch control lever locking mechanism comprises a switch frame member in which several switch control levers are mounted in parallel for slideable movement between first and second positions. A cam plate is also slideably mounted in the frame member for movement between first and second positions along a path which is at right angles to the path of movement of the control levers. The cam plate has first surfaces on it for engaging projections on the control levers when the cam plate is in a first position to prevent movement of the control levers from their first to their second positions. When the cam plate is moved to its second position, slots in it are then aligned with the projections on the control levers to permit movement of the control levers between their first and second positions. A solenoid is provided for selectively controlling the movement of the cam plate between its first and second positions.

More specifically, the switch control lever locking mechanism is used in a cassette recorder/player; and the solenoid is energized and de-energized in response to the insertion and removal, respectively, of a cassette from the player. When the cassette is not in the player, the solenoid is de-energized, placing the cam plate in its first position to prevent operation of the function control levers of the recorder/player. When a cassette is inserted into the recorder/player, the solenoid is energized to move the cam plate to its second position; thereby permitting normal operation of the function control levers of the recorder/player for placing it in its reproducing, recording, or other modes of operation.

The nature, principle, and utility of the present invention will be better understood from the following detailed description of the invention when read in conjunction with the accompanying drawing.

BRIEF DESCRIPTION OF THE DRAWING

In the drawing:

FIG. 1 illustrates the mechanism of a preferred embodiment of the invention used in a cassette recorder/player illustrating the arrangement of parts before a cassette is inserted into the recorder/player;

FIG. 2 illustrates the mechanism of FIG. 1 after a cassette has been inserted into the recorder/player;

FIG. 3 is an electrical circuit diagram illustrating the energizing circuit for the solenoid of FIG. 1 prior to the time a cassette is inserted;

FIG. 4 illustrates the solenoid energizing circuit after a cassette has been inserted; and FIG. 5 shows a side view of a portion of the mechanism of FIGS. 1 and 2.

DETAILED DESCRIPTION

Referring now to FIGS. 1 and 2, in which like parts are designated by the same reference numerals, there is indicated a control switch mechanism SW1 having a frame attached to the main body 1 of the tape recorder. A plurality of push-button type function control levers 2 are slideably mounted in the frame and are normally urged by retracting springs (not shown) in the direction of the arrow B to a first position. The levers 2 are respectively operable for controlling the operation of the tape recorder/player in reproduction, recording, and stop.

A cam plate 4 also is slideably mounted in the frame of the switch mechanism for movement at right angles to the movement of the levers 2, and is normally urged by a tension spring 3 in the direction of the arrow A in FIG. 1. The cam plate 4 is displaceable in a second position where a projection 2a on each of the control levers 2 (see FIG. 5) can intrude into a corresponding one of notched portions 4b and in a first position where the projecting portion 2a of each of the control levers 2 abuts a corresponding edge portion 4a of the cam plate 4 thereby prohibiting the operation of the control levers 2 from their first position to a second, depressed position (upward as viewed in FIGS. 1 and 2).

A solenoid 5 also is secured to the main body of the tape recorder and has an armature 6 disposed at a position facing an end 4c of the cam plate 4. A compression spring 7 normally urges the armature 6 toward the cam plate 4, so that the cam plate 4 is displaced to its first position (FIG. 1) against the resilience of the tension spring 3. When the solenoid is energized, the armature 6 is attracted leftwardly (as viewed in FIG. 2) into the solenoid 5, so that the cam plate 4 is allowed to retract to the left under the force of the spring 3 to its second position (FIG. 2) to permit operation of the control levers 2. In the first position of the cam plate 4, the projecting portion 2a of at least one of the control levers 2 abuts against an edge 4e of the notched portion of the cam plate as is apparent from FIG. 1. Similarly, in the second position of the cam plate 4, the projecting portion 2a of at least one of the control levers 2 abuts against an edge 4d of the notched portion of the cam plate 4 to define the limits of movement of the plate 4.

The forward and backward movements of the armature 6 operate an electric switch SW2 to cause the switch SW2 to open when the solenoid is energized to attract the armature 6 (FIG. 2), and the switch SW2 is closed when the solenoid is de-energized, as shown in FIG. 1.

The operation of the driving circuit of the solenoid 5 is shown in FIGS. 3 and 4. In the driving circuit, there are provided a power source E, another switch SW3 operated by the cassette when it is inserted into the tape recorder/player, and a resistor R connected in parallel with the switch SW2 which is connected in series with the operating coil of the solenoid 5.

The operation of the tape recorder/player according to the present invention will now be described. When a cassette is not yet inserted into the tape recorder/player, the switch SW3 is open as shown in FIG. 3, and the solenoid 5 is not energized although the switch SW2 is closed as shown in FIGS. 1 and 3. In this state, the cam plate 4 is shifted rightwardly by the spring 7 acting on the armature 6 against the resilience of the spring 3; so that the cam plate is brought into the first position wherein the projecting portions 2a of the control levers 2 abut against the edge portions 4a of the cam plate. The operation of the control levers 2 is thereby prevented.

When a cassette is inserted into the tape recorder/player, the electrical switch SW3 is closed, as shown in FIG. 4. Since the switch SW2 is still in the closed state, a comparatively heavy current flows through the coil of the solenoid 5, and the armature 6 is pulled into the solenoid against the resilience of the spring 7. As a result, the switch SW2 is opened as shown in FIG. 2, adding the resistor R into the energizing circuit of the solenoid 5. This reduces the solenoid current to a value just required for maintaining the armature attracted into the solenoid and minimizes power consumption. The cam plate 4 is now shifted leftwardly by the tension spring 3 to the second position of FIG. 2 to permit the projections 2a on the control levers 2 to intrude into the notches 4b of the cam plate 4 against the resilience of their respective biasing springs (not shown) as shown in FIG. 2. In this position, when a recording or reproducing lever 2 is depressed (upwardly in FIG. 2), the tape recorder/player is operated in the recording or reproducing mode with the control lever being locked in the depressed position (by conventional mechanism, not shown). When the recording or reproducing operation is desired to be stopped, the stop control lever is depressed, and the recording or reproducing control lever is thereby released from the locked state and the operation of the tape recorder/player is thereby stopped in a conventional manner.

If the cassette is removed from the tape recorder/player in this state, the switch SW3 operated by the cassette is opened, thus de-energizing the solenoid 5. The armature 6 then is retracted rightwardly by the resilience of the spring 7, to close the switch SW2, and shift the cam plate 4 rightwardly to the first position where the projecting portions 2a of the control levers 2 abut against the edge portions 4a of the cam plate 4 as shown in FIG. 1.

Thus, according to the present invention, the operation of the function control levers 2 is prevented until a cassette is inserted into the tape recorder/player. This minimizes the chance of damage to the magnetic head and the magnetic tape. Furthermore, the construction of the locking mechanism of the tape recorder/player is simple, and the operation is reliable.

Although in the above described example of a preferred embodiment of the invention, the cam plate 4 has been described as directly shifted by the retraction of the armature 6, it is possible that a linking mechanism may also be interposed between the two members. Furthermore, the switch SW3 for operating the solenoid 5 may also be inter-related with the insertion and removal of an open-reel instead of the above described cassette, so that the invention may also be applied to the open-reel type tape recorder.

I claim:

1. A switch control lever locking mechanism including in combination:

a switch frame member;

a switch control lever, having a projecting portion thereon, slideably mounted in said frame member for movement between first and second positions;

a cam plate slideably mounted in said frame member for movement between first and second positions along a path at right angles to the path of movement of said switch control lever and having a first surface thereon for engaging the projecting portion of said control lever with said cam plate in said first position to prevent movement of said control lever from the first to the second position thereof, said cam member further having a slot therein aligned with the projection on said control lever with said cam plate in said second position to permit movement of said switch control lever between the first and second positions thereof; and means for selectively moving said cam plate between the first and second positions thereof, said means for moving said cam plate including a solenoid having an armature operatively coupled with said cam plate for controlling movement thereof between said first and second positions and including means for supplying a first amount of electrical power to said solenoid for moving said cam plate means from one of said first and second positions to the other and means for supplying a reduced amount of power to said solenoid to positively maintain said cam plate means in said other position.

2. The combination according to claim 1 further including first spring means coupled between said cam plate and said switch frame-member for resiliently biasing said cam plate to the second position thereof, and said solenoid further including second spring means biasing the armature thereof to operable relationship with said cam plate to overcome the bias of said first spring means to move said cam plate to said first position thereof with said solenoid in one state of operation, said solenoid in a second state of operation moving the armature thereof against the bias of said second spring means to permit said first spring means to move said cam plate to said second position thereof.

* * * * *